United States Patent
Jang et al.

(10) Patent No.: US 10,879,529 B2
(45) Date of Patent: Dec. 29, 2020

(54) SURFACE-COATED POSITIVE ELECTRODE ACTIVE MATERIAL PARTICLES AND SECONDARY BATTERY COMPRISING THE SAME

(71) Applicant: LG Chem, Ltd., Seoul (KR)

(72) Inventors: Wook Jang, Daejeon (KR); Seung Beom Cho, Daejeon (KR); Jin Young Park, Daejeon (KR); Kyung Jun Kim, Daejeon (KR); Jun Seong Ahn, Daejeon (KR)

(73) Assignee: LG Chem, Ltd.

( * ) Notice: Subject to any disclaimer, the term of this patent is extended or adjusted under 35 U.S.C. 154(b) by 206 days.

(21) Appl. No.: 16/079,247

(22) PCT Filed: Mar. 21, 2017

(86) PCT No.: PCT/KR2017/003030
§ 371 (c)(1),
(2) Date: Aug. 23, 2018

(87) PCT Pub. No.: WO2017/164624
PCT Pub. Date: Sep. 28, 2017

(65) Prior Publication Data
US 2020/0127284 A1    Apr. 23, 2020

(30) Foreign Application Priority Data
Mar. 21, 2016 (KR) .................. 10-2016-0033193

(51) Int. Cl.
| | | |
|---|---|---|
| H01M 4/36 | (2006.01) | |
| H01M 4/131 | (2010.01) | |
| H01M 4/134 | (2010.01) | |
| H01M 4/62 | (2006.01) | |
| H01M 10/0525 | (2010.01) | |
| H01M 4/02 | (2006.01) | |

(52) U.S. Cl.
CPC .......... *H01M 4/366* (2013.01); *H01M 4/131* (2013.01); *H01M 4/134* (2013.01); *H01M 4/623* (2013.01); *H01M 10/0525* (2013.01); *H01M 2004/027* (2013.01); *H01M 2004/028* (2013.01); *H01M 2220/20* (2013.01)

(58) Field of Classification Search
CPC .............................. H01M 4/366; H01M 4/623
USPC .................................................... 429/231.95
See application file for complete search history.

(56) References Cited

U.S. PATENT DOCUMENTS

| | | |
|---|---|---|
| 2008/0166474 A1 | 7/2008 | Deguchi et al. |
| 2011/0109857 A1 | 5/2011 | Imanishi et al. |
| 2014/0154572 A1 | 6/2014 | Singh et al. |
| 2015/0325840 A1 | 11/2015 | Mizuike et al. |
| 2016/0126544 A1* | 5/2016 | Fan ...................... H01M 4/583 429/217 |
| 2017/0170480 A1 | 6/2017 | Jang et al. |

FOREIGN PATENT DOCUMENTS

| | | |
|---|---|---|
| CN | 103078081 A | 5/2013 |
| CN | 103534843 A | 1/2014 |
| KR | 20100061349 A | 6/2010 |
| KR | 20110126418 A | 11/2011 |
| KR | 101105342 B1 | 1/2012 |
| KR | 20150025488 A | 3/2015 |
| KR | 20160024777 A | 3/2016 |
| WO | 2014157922 A1 | 10/2014 |
| WO | 2015148601 A1 | 10/2015 |

OTHER PUBLICATIONS

Jiang et al. Polyimides membranes for pervaporation and biofuels separation. Progress in Polymer Science, vol. 34, Issue 11, 2009 , pp. 1135-1160 [online]. Retrieved from <URL: https://www.sciencedirect.com/science/article/pii/S0079670009000562> (Year: 2009).*
Extended European Search Report including Written Opinion for Application No. EP17770594.4 dated Apr. 24, 2019.
Search report from International Application No. PCT/KR2017/003030, dated Jun. 30, 2017.
Park, Jang-Hoon, et al., "Polyimide Gel Polymer Electrolyte-nanoencapsulated LiCoO2 Cathode Materials for High-voltage Li-ion Batteries." Electrochemistry Communications, Jun. 2, 2010, vol. 12, No. 8, pp. 1099-1102.
Chinese Search Report for Application No. 201780013659.2 dated Sep. 10, 2020, 2 pages.

\* cited by examiner

*Primary Examiner* — James M Erwin
(74) *Attorney, Agent, or Firm* — Lerner, David, Littenberg, Krumholz & Mentlik, LLP

(57) ABSTRACT

The present invention relates to surface-coated positive electrode active material particles and a secondary battery including the same, and specifically, it provides surface-coated positive electrode active material particles including positive electrode active material particles and a coating layer applied on a surface of the positive electrode active material particles, wherein the coating layer includes a polyimide comprising one or more structures selected from the group consisting of pyrrole, aniline, and carbazole. The surface-coated positive electrode active material particles according to the present invention includes a coating layer including a polyimide and metal ions; and since a direct contact between the positive electrode active material particles and an electrolyte can be prevented, a side reaction therebetween can be inhibited, and both excellent lithium ion mobility and excellent electron conductivity can be exhibited. Accordingly, a secondary battery with improved battery life and cycle characteristics at high-voltage and high-temperature conditions can be obtained.

19 Claims, No Drawings

SURFACE-COATED POSITIVE ELECTRODE ACTIVE MATERIAL PARTICLES AND SECONDARY BATTERY COMPRISING THE SAME

CROSS-REFERENCE TO RELATED APPLICATION

This application is a national phase entry under 35 U.S.C. § 371 of International Application No. PCT/KR2017/003030, filed Mar. 21, 2017, which claims priority to Korean Patent Application No. 10-2016-0033193, filed, Mar. 21, 2016, the disclosures of which are incorporated herein by reference.

TECHNICAL FIELD

The present invention relates to surface-coated positive electrode active material particles and a secondary battery including the same.

BACKGROUND ART

Lithium secondary batteries, which are small, lightweight, and large-capacity batteries, have been widely used as the power source of mobile devices since they appeared in 1991. With the recent rapid development of the electronics, communication, and computer industries, devices such as camcorders, mobile phones, and notebook personal computers (PCs) have emerged and made remarkable progress, and accordingly, the demand for lithium secondary batteries as the power source for driving these mobile electronic information communication devices is increasing daily.

However, lithium secondary batteries have a problem in that their battery life is rapidly shortened by repeated charging and discharging.

Such a shortening of battery life is caused by a side reaction between the positive electrode and the electrolyte, and the phenomenon may become more severe at high-voltage and high-temperature conditions.

Therefore, there is a need for developing a secondary battery for high-voltage applications, and, for this purpose, a technique for controlling a reaction at an electrode interface or a side reaction between the positive electrode active material and the electrolyte is very important.

To solve such problems, techniques for coating a surface of a positive electrode active material with a metal oxide including Mg, Al, Co, K, Na, Ca, or the like have been developed.

In particular, it is generally known that a surface of a positive electrode active material can be coated with an oxide such as $Al_2O_3$, $ZrO_2$, and $AlPO_4$. It has also been widely accepted that the coating layer improves the stability of the positive electrode active material.

However, when the above-described oxide coating layer is applied on a surface of a positive electrode active material, the oxide coating layer is in the form of nano-sized particles finely dispersed on the surface of the positive electrode active material, rather than covering the entire surface as a whole.

As a result, the effect of surface modification of a positive electrode active material by coating with an oxide layer is limited. In addition, the oxide coating layer is a kind of an ion-insulating layer which does not allow easy migration of lithium ions, and may cause deterioration of ion conductivity.

In the meantime, there has been a patent on a coating technique that applies, on a surface of a positive electrode material, a polyimide coating having higher ion conductivity than an oxide coating layer and preventing direct contact with an electrolyte by providing uniform coverage of the surface of the positive electrode material, and thus reducing a side reaction between the positive electrode and the electrolyte.

However, it is difficult for a coating layer consisting only of a polyimide to have electron conductivity. Therefore, a conductive material such as carbon black may be added to a polyimide coating layer to supplement electrical conductivity of the same, but, from a molecular point of view, carbon black is a large molecule with a size of at least 10 nm, and carbon black aggregates forming secondary particles may not be uniformly dispersed throughout a polyimide coating layer.

PRIOR-ART DOCUMENTS

Patent Documents (Patent Document 1) Korean Patent No. 10-1105342

DETAILED DESCRIPTION OF THE INVENTION

Technical Problem

The present invention is devised to solve the aforementioned problems.

The technical objective of the present invention is to provide surface-coated positive electrode active material particles which, by including a coating layer formed on a surface of positive electrode active material particles, not only prevent a side reaction between the positive electrode active material and an electrolyte but also exhibit excellent lithium ion mobility and excellent electron mobility.

Technical Solution

To achieve the technical objective, the present invention provides surface-coated positive electrode active material particles consisting of positive electrode active material particles and a coating layer applied on a surface of the positive electrode active material particles, wherein the coating layer includes a polyimide comprising one or more structures selected from the group consisting of pyrrole, aniline, and carbazole.

In addition, the present invention provides a battery module and a battery pack using a secondary battery, wherein the secondary battery includes a positive electrode in which a positive electrode mixture including the surface-coated positive electrode active material particles is applied, a negative electrode, and a separator interposed between the positive electrode and negative electrode.

Advantageous Effects of the Invention

The surface-coated positive electrode active material particles according to the present invention include a coating layer including a polyimide, wherein the polyimide includes one or more structures selected from the group consisting of pyrrole, aniline, and carbazole.

Since lithium ions migrating during the charging and discharging of a lithium secondary battery are captured in the above structures by the unshared electrons generated from an NH group in the above structures dissociating to release the H as H⁺, the polyimide coating layer can exhibit uniform conductivity throughout the layer.

In addition, since the polyimide coating layer prevents the positive electrode active material particles from directly contacting an electrolyte, a side reaction between the positive electrode active material particles and electrolyte can be inhibited, and thus, the battery life and cycle characteristics of the secondary battery at high-voltage and high-temperature conditions can be improved.

Furthermore, the polyimide coating layer further includes metal ions that have been added in the production process thereof, and thus can exhibit more improved lithium ion mobility and more enhanced electron conductivity.

Mode of the Invention

Hereinafter, more detailed description of the present invention will be provided to facilitate understanding of the present invention.

The terms or words used herein and in the claims should not be restrictively construed according to their ordinary or dictionary meaning, and, based on the principle that the inventor can appropriately define concepts of terms for describing his/her invention in the best way, should be interpreted to have the meaning and concept that are consistent with the technical spirit of the present invention.

The terminology provided herein is merely used for the purpose of describing particular embodiments and is not intended to be limiting of exemplary embodiments of the present invention. The singular forms "a," "an", and "the" are intended to include the plural forms as well unless the context clearly indicates otherwise.

It should be understood that the terms "comprises," "comprising," "includes," "including," "has," and/or "having," when used herein, specify the presence of stated features, integers, steps, operations, elements, components, and/or combinations thereof, but do not preclude the presence or addition of one or more other features, integers, steps, operations, elements, components, and/or combinations thereof.

In one embodiment of the present invention, the surface-coated positive electrode active material particles according to the present invention include positive electrode active material particles and a coating layer applied on a surface of the positive electrode active material particles, and the coating layer may include a polyimide including one or more structures selected from the group consisting of pyrrole, aniline, and carbazole.

A conventional inorganic oxide coating layer generally applied on a surface of a positive electrode active material is an ion-insulating layer and thus has a low conductivity. Therefore, to mitigate the problem of low conductivity, a coating layer including a polyimide and a material that can be used as a conductive material may be employed. However, in this case, there is a problem in that the conductive material cannot be homogeneously dispersed in polyimide, and thus conductivity cannot be exhibited uniformly throughout the coating layer.

In one embodiment of the present invention, the coating layer included in the surface-coated positive electrode active material particles may include a conductive polyimide capable of allowing the migration of lithium ions and electrons. Furthermore, by being applied on a surface of the positive electrode active material particles, the coating layer can prevent a side reaction between the positive electrode active material and an electrolyte and can thereby improve battery life.

Specifically, the coating layer may have been applied as a thin film covering the entire surface of the positive electrode active material particles. This way, the surface-coated positive electrode active material particles may have more improved battery life and more improved conductivity not only under normal conditions but also under high-voltage and high-temperature conditions in particular.

Specifically, the polyimide included in the coating layer serves as a protective film that prevents the positive electrode active material from directly contacting the electrolyte and, at the same time, can also serve as a path in the coating layer through which electrons can pass due to the excellent electrical conductivity and excellent lithium ion conductivity thereof. Therefore, the polyimide maintains a uniform current and a uniform voltage distribution in the electrode during charging and discharging, and thereby significantly improves cycle characteristics.

More specifically, since lithium ions migrating during the charging and discharging of a lithium secondary battery are captured by the unshared electrons generated from an NH group in the polyimide dissociating to release the H as H⁺, the polyimide coating layer can exhibit uniform conductivity throughout the layer.

In one embodiment of the present invention, the polyimide may include one or more structures selected from the group consisting of pyrrole, aniline, and carbazole.

The structural formulas of pyrrole, aniline, and carbazole are provided respectively in the following Chemical Formula 6, Chemical Formula 7, and Chemical Formula 8.

[Chemical Formula 6]

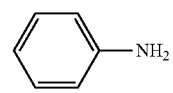

[Chemical Formula 7]

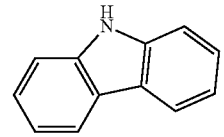

[Chemical Formula 8]

All of the above-described pyrrole, aniline, and carbazole have an NH group. Unshared electrons may be generated from the NH group dissociating to release the H as H⁺, wherein the dissociation may take place, for example, in an electrolyte.

The polyimide including the above-described structure(s) can have conductivity from lithium ions migrating in the secondary battery during charging and discharging processes being captured by the unshared electrons of nitrogen in the structure(s). Therefore, the polyimide coating layer has conductivity and thus facilitates migration of lithium ions and electrons.

In one embodiment of the present invention, the coating layer may include metal ions. In this case, the metal ions may be lithium ions migrating in the secondary battery during charging and discharging processes.

In another embodiment of the present invention, the coating layer may further include metal ions in addition to the lithium ions migrating in the secondary battery during charging and discharging processes. The metal ions enable electrons to move more actively in the polyimide coating layer and thus may further improve output characteristics of the surface-coated positive electrode active material particles. Unlike the lithium ions migrating in the secondary battery during charging and discharging processes, the metal ions may be added during the production of the surface-coated positive electrode active material particles.

The metal ions may be the ions of one or more metals selected from the group consisting of magnesium, aluminum, zirconium, zinc, ruthenium, cesium, copper, iron, chromium, titanium, and lanthanum. Electron migration may be facilitated when the metal ions are specifically of one type selected from the group consisting of magnesium ions, aluminum ions, and zirconium ions, but the present invention is not limited thereto.

Specifically, the above-described polyimide and metal ions included in the coating layer may have the following characteristics.

For example, the polyimide is a product of a condensation polymerization of pyromellitic dianhydride (PMDA) and 4,4'-iminodianiline (IDA) and may be represented by the following Chemical Formula 4. The polyimide may include aniline and may include unshared electrons in a nitrogen atom of the aniline structure. In this case, the unshared electrons may be electrons that have been generated from NH dissociating to release the H as $H^+$. Since lithium ions migrating in the secondary battery during charging and discharging processes or the metal ions added during the production of the coating layer are captured by the unshared electrons in a nitrogen atom, the coating layer can exhibit conductivity.

[Chemical Formula 4]

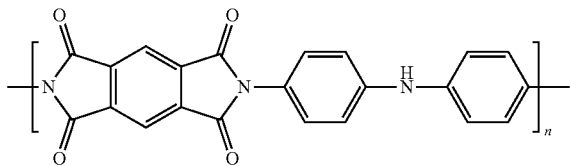

In one embodiment of the present invention, the metal ions may be included in an amount of 3 parts by weight or less with respect to 100 parts by weight of polyimide. When the content of metal ions exceeds 3 parts by weight with respect to 100 parts by weight of polyimide, the metal ions may be eluted into an electrolyte. The metal ions eluted into the electrolyte are reduced at the negative electrode and form a metal salt, which may increase the internal resistance of the secondary battery.

The metal ions may be included in an amount of 0.15 part by weight or less with respect to 100 parts by weight of the positive electrode active material particles.

In this case, the metal ions may refer to the metal ions which, unlike the lithium ions migrating in the secondary battery during charging and discharging processes, have been added during the production of the surface-coated positive electrode active material particles.

In one embodiment of the present invention, the polyimide may be included in an amount of 0.05 part by weight to 5 parts by weight with respect to 100 parts by weight of the positive electrode active material particles. When the content of the polyimide is below 0.05 part by weight with respect to 100 parts by weight of the positive electrode active material particles, a surface of the positive electrode active material particles may not be fully covered and thus a side reaction between the positive electrode active material particles and an electrolyte cannot be sufficiently prevented. On the other hand, when the content of the polyimide exceeds 5 parts by weight with respect to 100 parts by weight of the positive electrode active material particles, increased lithium ion migration resistance may result.

The metal ions may be included in an amount of 0.15 part by weight or less with respect to 100 parts by weight of the positive electrode active material particles.

The content of the metal ions in polyimide may be measured using an inductively coupled plasma (ICP) measuring device, and the morphology of the polyimide relative to the positive electrode active material may be obtained using a scanning electron microscope (SEM).

The coating layer may have a thickness of 1 to 200 nm, particularly 5 to 50 nm. When the coating layer has a thickness of less than 1 nm, the effect of preventing a side reaction between the positive electrode active material and electrolyte by the coating layer may be insignificantly small. On the other hand, when the coating layer has a thickness of greater than 200 nm, lithium ion migration may be hindered, and lithium ion migration resistance may increase.

In one embodiment of the present invention, the positive electrode active material particles are not particularly limited as long as they comprise a compound that is applicable under normal voltage or high-voltage conditions and capable of reversibly intercalating/deintercalating lithium.

Specifically, in one embodiment of the present invention, the surface-coated positive electrode active material particles may include one or more complex oxides selected from the group consisting of large-capacity spinel lithium transition-metal oxides having a hexagonal layered rock-salt structure, olivine structure, or cubic structure, and $V_2O_5$, TiS, and MoS. More specifically, the surface-coated positive electrode active material particles may include one or more selected from the group consisting of the oxides represented by the following Chemical Formulas 1 to 3, and $V_2O_5$, TiS, and MoS;

$Li_{1+x}[Ni_aCo_bMn_c]O_2$ <Chemical Formula 1>

($-0.5 \leq x \leq 0.6$, $0 \leq a, b, c \leq 1$, and $x+a+b+c=1$);

$LiMn_{2-x}M_xO_4$ <Chemical Formula 2>

(M is one or more elements selected from the group consisting of Ni, Co, Fe, P, S, Zr, Ti, and Al, and $0 \leq x \leq 2$);

$Li_{1+a}Fe_{1-x}M_x(PO_{4-b})X_b$ <Chemical Formula 3>

(M is one or more elements selected from the group consisting of Al, Mg, Ni, Co, Mn, Ti, Ga, Cu, V, Nb, Zr, Ce, In, Zn, and Y, X is one or more elements selected from the group consisting of F, S, and N, and $-0.5 \leq a \leq +0.5$, $0 \leq x \leq 0.5$, and $0 \leq b \leq 0.1$).

More specifically, the positive electrode active material particles may include one or more selected from the group consisting of $LiCoO_2$, $LiNiO_2$, $LiMnO_2$, $LiMn_2O_4$, $Li[Ni_aCo_bMn_c]O_2$ ($0<a, b, c \leq 1$ and $a+b+c=1$), and $LiFePO_4$.

One embodiment of the present invention provides a method for producing the surface-coated positive electrode active material particles.

The method for producing positive electrode active material particles according to one embodiment of the present invention may include the processes of preparing a mixed solution by mixing a polyamic acid including one or more structures selected from the group consisting of pyrrole, aniline, and carbazole with an organic solvent (process 1); dispersing positive electrode active material particles in the mixed solution to form a coating layer including the polyamic acid on a surface of the positive electrode active material particles (process 2); and carrying out an imidation of the positive electrode active material particles including the coating layer applied thereon (process 3).

Specifically, in the method for producing surface-coated positive electrode active material particles according to one embodiment of the present invention, the process 1 is a process of preparing a mixed solution by mixing a polyamic acid including one or more structures selected from the group consisting of pyrrole, aniline, and carbazole with an organic solvent.

The polyamic acid may include one or more structures selected from the group consisting of pyrrole, aniline, and carbazole.

The polyamic acid may be produced using an aromatic anhydride and a diamine by a conventional method used in the art. More specifically, the polyamic acid may be produced by reacting the same chemical equivalents of an aromatic anhydride and a diamine.

In this case, either one or both of the aromatic anhydride and diamine may include one or more structures selected from the group consisting of pyrrole, aniline, and carbazole.

For example, when either one of the aromatic anhydride and diamine includes the above structure(s), the polyamic acid chain produced by the condensation polymerization of the aromatic anhydride and diamine may include the above structure(s) therein, and the polyimide produced using the polyamic acid may also include the above structure(s) therein. Specifically, the diamine including one or more structures selected from the group consisting of pyrrole, aniline, and carbazole may be 4,4'-iminodianiline, but the diamine including the above structure(s) is not limited thereto.

When the diamine including one or more structures selected from the group consisting of pyrrole, aniline, and carbazole is used, any one or a mixture of two or more selected from the group consisting of, for example, phthalic anhydride, pyromellitic dianhydride, 3,3',4,4'-biphenyltetracarboxylic dianhydride, 4',4-oxydiphthalic anhydride, 3,3', 4,4'-benzophenone tetracarboxylic dianhydride, trimellitic ethylene glycol, 4,4'-(4',4-isopropylbiphenoxy)biphthalic anhydride, and trimellitic anhydride may be used as the aromatic anhydride.

When the aromatic anhydride including one or more structures selected from the group consisting of pyrrole, aniline, and carbazole is used, any one or a mixture of two or more selected from the group consisting of, for example, 4,4'-oxydianiline, p-phenyl diamine, 2,2-bis(4-(4-aminophenoxy)phenyl)propane, p-methylene dianiline, propyltetramethyldisiloxane, polyaromatic amines, 4,4'-diaminodiphenyl sulfone, 2,2'-bis(trifluoromethyl)-4,4'-diaminobiphenyl, and 3,5-diamino-1,2,4-triazole may be included as the diamine.

In one embodiment of the present invention, the polyamic acid may be produced by the condensation polymerization of PMDA as the aromatic anhydride and IDA (4,4'-iminodianiline) as the diamine.

In this case, the NH group of aniline in IDA represented by the following Chemical Formula 5 obtains unshared electrons from dissociating to release the H as $H^+$, and the polyimide prepared through the polymerization by using the above IDA may also have unshared electrons in aniline. Lithium ions migrating in the secondary battery during charging and discharging may be captured by the unshared electrons, and, accordingly, the polyimide can exhibit conductivity. Therefore, by having such a conductive coating layer, the surface-coated positive electrode active material may exhibit excellent lithium ion mobility and excellent electron mobility.

Furthermore, when metal ions other than the lithium ions present in the secondary battery are further included in the coating layer, more improved conductivity can be attained because there are an increased number of metal ions captured by the unshared electrons.

[Chemical Formula 5]

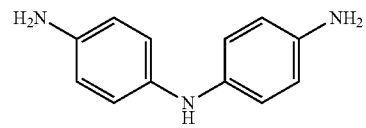

The polyamic acid may be included in an amount of 0.1 part by weight to 1 part by weight with respect to 100 parts by weight of an organic solvent.

In the method for producing surface-coated positive electrode active material particles according to one embodiment of the present invention, a coating layer including a polyamic acid and metal ions may be formed through the process 2 when metal ions have been further added to the organic solvent of the process 1 in addition to the polyamic acid.

The metal ions may be generated from a metal ion precursor, wherein the metal ion precursor may be one or more selected from the group consisting of inorganic acid salts, organic acid salts, and metal complexes of the metal ions. In particular, the metal ion precursor may be an inorganic acid salt of the metal ions.

For example, when the metal ions are magnesium ions, the metal ion precursor may be magnesium nitrate, which is an inorganic acid salt of the metal ions, and, when the metal ions are zirconium ions, the metal ion precursor may be zirconium sulfate, which is an inorganic acid salt of the metal ions.

The organic solvent is not particularly limited as long as it is a solvent capable of dissolving the polyamic acid. The organic solvent may be one or more selected from the group consisting of cyclohexane, carbon tetrachloride, chloroform, methylene chloride, dimethylformamide, dimethylacetamide, and N-methylpyrrolidone.

In the method for producing surface-coated positive electrode active material particles according to one embodiment of the present invention, the process 2 may include dispersing positive electrode active material particles in the above-described solution to form a coating layer including the polyamic acid on a surface of the positive electrode active material particles. When metal ions are further added in the process 1, the coating layer may include a polyamic acid and metal ions.

To homogeneously disperse the positive electrode active material particles in the solution, it is preferable that the dispersion process is carried out using a high-speed stirrer for at least one hour after the positive electrode active material particles are added. When the solvent is removed through heating and concentration after it has been confirmed that the positive electrode active material particles have been homogeneously dispersed, positive electrode active material particles whose surface is coated with a coating layer including a polyamic acid or both a polyamic acid and metal ions can be obtained.

In the method for producing surface-coated positive electrode active material particles according to one embodiment of the present invention, the process 3 is a process of converting, through an imidation reaction, the polyamic acid included in a coating layer formed on a surface of the positive electrode active material particles through the process 2 into a polyimide.

When the coating layer further includes metal ions, after the polyamic acid is converted to a polyimide through the process 3, the added metal ions are present in an captured state in the coating layer by the unshared electrons generated from NH in the polyimide chain dissociating to release the H as $H^+$, which may further improve electron conductivity.

The imidation reaction may be implemented by raising the temperature of the positive electrode active material particles coated with the coating layer produced through the process 2 to about 300° C. to 400° C. at intervals of 50° C. to 100° C., at a rate of 3° C./min, and then maintaining the temperature within a range of 300° C. to 400° C. for 10 to 120 minutes. In addition, after raising the temperature at intervals of 50° C. to 100° C., the temperature may be maintained, for example, for 10 to 120 minutes, and then raised again. More specifically, the imidation reaction may be implemented by raising the temperature of the positive electrode active material particles coated with a film to 60° C., 120° C., 200° C., 300° C., or 400° C. at a rate of 3° C./min and then maintaining the temperature of 60° C. for 30 minutes, 120° C. for 30 minutes, 200° C. for 60 minutes, 300° C. for 60 minutes, or 400° C. for 10 minutes.

Through the process 3, the positive electrode active material particle surface of the process 2 may be covered with a coating layer including a polyimide or both a polyimide and metal ions.

In one embodiment of the present invention, the surface-coated positive electrode active material particles including positive electrode active material particles; and a coating layer including a polyimide and metal ions on a surface of the positive electrode active material particles inhibit a direct reaction between the positive electrode active material particles and an electrolyte; therefore, the surface-coated positive electrode active material particles can improve battery life under both normal-voltage conditions and high-voltage conditions, and can particularly and more importantly improve battery life under high-voltage and high-temperature conditions.

In the present specification, the term "normal voltage" may refer to a case in which the charging voltage of a lithium secondary battery is in a range of 3.0 V and less than to 4.2 V, the term "high voltage" may refer to a case in which the charging voltage is in a range of 4.2 to 5.0 V, and the term "high temperature" may refer to a temperature of 45° C. to 65° C.

Also, the present invention provides a positive electrode including the surface-coated positive electrode active material particles.

In one embodiment of the present invention, the positive electrode may be produced as follows. The surface-coated positive electrode active material particles are mixed with a solvent, and if necessary, also with a binder, a conductive material, and a dispersant, the mixture is stirred to prepare a positive electrode mixture slurry, and the slurry is applied on a current collector made of a metal, pressed and then dried to produce a positive electrode coated with the positive electrode mixture. However, the method of producing the positive electrode is not limited thereto.

The current collector made of a metal is not particularly limited and may be made of any metal as long as the metal has high conductivity, is a metal to which the positive electrode active material slurry can be easily adhered, and is not reactive within a voltage range of the battery. Non-limiting examples of the positive electrode current collector include aluminum, nickel, and foils made of a combination of aluminum and nickel.

The solvent for forming the positive electrode may be an organic solvent such as N-methyl pyrrolidone (NMP), dimethylformamide (DMF), acetone, or dimethylacetamide; or water, or the like, and the solvent may be used alone or in a combination of two or more. The solvent is used in an amount just enough to dissolve and disperse the positive electrode active material, binder, and conductive material in consideration of a thickness of an applied slurry and manufacturing yield.

As the binder, any of various types of polymeric binders such as poly(vinylidene fluoride-co-hexafluoropropylene) polymers (PVDF-co-HFPs), polyvinylidene fluorides, polyacrylonitriles, polymethyl methacrylates, polyvinyl alcohols, carboxymethyl celluloses (CMCs), starches, hydroxypropyl cellulose, regenerated celluloses, polyvinylpyrrolidones, tetrafluoroethylene, polyethylenes, polypropylenes, ethylene-propylene-diene monomers (EPDMs), sulfonated EPDMs, styrene-butadiene rubbers (SBRs), fluorinated rubbers, polyacrylic acids, and polymers in which hydrogen atoms of the above polymers are substituted with Li, Na, Ca or the like; or any of various copolymers, or the like may be used.

The conductive material is not particularly limited as long as it does not cause a chemical change in the battery and has conductivity. For example, the conductive material may be graphite such as natural graphite or artificial graphite; carbon black such as carbon black, acetylene black, Ketjen black, channel black, furnace black, lamp black, or thermal black; a conductive fiber such as carbon fiber or metallic fiber; conductive tubes such as carbon nanotubes; metallic powder such as carbon fluoride powder, aluminum powder, or nickel powder; a conductive whisker such as zinc oxide or potassium titanate; a conductive metal oxide such as titanium oxide; or a conductive material such as a polyphenylene derivative.

The dispersant may be an aqueous dispersant or an organic dispersant such as N-methyl-2-pyrrolidone.

In addition, the present invention provides a secondary battery including the positive electrode, a negative electrode, and a separator interposed between the positive electrode and negative electrode.

A negative electrode active material that may be used in the negative electrode according to one embodiment of the present invention is conventionally a carbon material capable of intercalating and deintercalating lithium ions, lithium metal, silicon, tin, or the like. Preferably, the negative electrode active material is a carbon material, wherein the carbon material may be any of low-crystalline carbon and high-crystalline carbon. Soft carbon and hard carbon are representative of low-crystalline carbon; and high-temperature calcined carbon such as natural graphite, Kish graphite, pyrolytic carbon, mesophase pitch-based carbon fiber, mesocarbon microbeads, mesophase pitches, and petroleum or coal tar pitch-derived cokes are representative of high-crystalline carbon.

The negative electrode current collector is generally prepared with a thickness of 3 to 500 μm. Such a negative electrode current collector is not particularly limited as long as it does not cause a chemical change in the battery and has conductivity. For example, the negative electrode current collector may be copper, stainless steel, aluminum, nickel, titanium, calcined carbon; copper or stainless steel whose surface has been treated with carbon, nickel, titanium, or silver; or an aluminum-cadmium alloy. Also, as in the case of a positive electrode current collector, the negative electrode current collector may have fine irregularities on a surface thereof so as to increase adhesion to the negative electrode active material. In addition, the negative electrode current collector may be used in any of various forms such as a film, a sheet, a foil, a net, a porous material, a foam, and a non-woven fabric.

As in the case of a positive electrode, the negative electrode may be produced using a binder and a conductive material that may be commonly used in the art. The negative electrode may be produced by mixing a negative electrode active material and the additives and stirring the mixture to prepare a negative electrode active material slurry, and then applying the slurry on a current collector, followed by pressing.

The separator may be a common porous polymer film conventionally used as a separator. For example, the separator may be a porous polymer film made of a polyolefin-based polymer such as an ethylene photopolymer, a propylene homopolymer, an ethylene/butene copolymer, an ethylene/hexene copolymer, or an ethylene/methacrylate copolymer, in which case the porous polymer film made of a polyolefin-based polymer may be used alone, or two or more thereof may be laminated for use. Alternatively, the separator may be a common porous non-woven fabric such as a non-woven fabric made of high-melting-point glass fiber, polyethylene terephthalate fiber, or the like, but the present invention is not limited thereto.

A lithium salt that may be included as an electrolyte used in the present invention may include, as an anion, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Examples of the electrolyte used in the present invention include organic liquid electrolytes, inorganic liquid electrolytes, solid polymer electrolytes, gel polymer electrolytes, inorganic solid electrolytes, and molten-type inorganic electrolytes, which can be used in the production of a lithium secondary battery, but the present invention is not limited thereto.

The appearance of the lithium secondary battery according to the present invention is not particularly limited, but the lithium secondary battery may have the appearance of a can made into a cylindrical form, a prismatic form, a pouch form, a coin form, or the like.

The lithium secondary battery according to the present invention may be used in a battery module that includes the lithium secondary battery as a unit cell. Specifically, the lithium secondary battery according to the present invention may be applied in a battery cell used as a power source for a small sized device and is preferably used as a unit cell of a medium to large sized battery module including a plurality of battery cells.

Preferable examples of the medium to large sized device may include electric vehicles, hybrid electric vehicles, plug-in hybrid electric vehicles, and electric power storage systems, but the present invention is not limited thereto.

Hereinafter, exemplary embodiments of the present invention will be described in detail so that the present invention can be easily implemented by those of ordinary skill in the art. However, the present invention may be embodied in many different forms and should not be construed as being limited to the embodiments set forth herein.

PREPARATION EXAMPLE

Preparation of Polyamic Acid 4.704 g (23.606 mol) of IDA (4,4'-iminodianiline) was dissolved in 40 g of dimethylacetamide (DMAC) reaction solvent in a 250 mL reactor equipped with a stirrer and a nitrogen injection device while nitrogen gas was slowly passed through the reactor. Subsequently, 4.737 g (21.717 mol) of pyromellitic acid dianhydride (PMDA) and 0.559 g (3.777 mol) of phthalic anhydride (PA), which is an end-capper, were added to the reactor while nitrogen gas was passed through the reactor, and then another 50 g of the solvent was added to the reactor. Polymerization was carried out for 12 hours at 30° C. to obtain a polyamic acid (PMDA+IDA). The polymeric acid (PMDA+IDA) had an intrinsic viscosity of 1.87 dL/g as measured at a concentration of 0.5 dL/g in a 30° C. DMAC solution and had a weight average molecular weight ($M_w$) of 55,000 g/mol.

EXAMPLE 1

Process 1: Preparation of Mixed Solution Including Polyamic Acid and Metal Ions Dispersed Therein 1 g of DMAC containing 20 wt % of magnesium nitrate hexahydrate ($Mg(NO_3)_2 6H_2O$, FW256.41, Kwang Jin Chemical; corresponding to a $Mg^{2+}$ concentration of 2 wt % in DMAC) dissolved therein was added to 20 g of a solution (prepared by diluting 0.5 part by weight of a polyamic acid with 100 parts by weight of DMAC organic solvent) to prepare a mixed solution, wherein the polyamic acid was produced by a condensation polymerization of PMDA and IDA (4,4'-iminodianiline).

Process 2: Coating Layer Formation on Surface of Positive Electrode Active Material Particle 20 g of $LiCoO_2$ particles as a positive electrode active material was added to the mixed solution obtained through the process 1, and stirring was performed using a high-speed stirrer for one hour. While stirring was continued, the temperature was raised to the boiling point of the solvent. This way, the solvent was evaporated, resulting in a surface-coated positive electrode active material including a coating layer containing a polyamic acid and magnesium ions.

Process 3: Imidation Reaction for Production of Surface-Coated Positive Electrode Active Material Including Coating Layer Containing Polyimide and Magnesium Ions The temperature of the positive electrode active material obtained through the process 2 and coated with a coating layer containing a polyamic acid and metal ions was raised to 60° C., 120° C., 200° C., 300° C., or 400° C. at a rate of 3° C./min and then maintained for 30 minutes for the temperature of 60° C., 30 minutes for 120° C., 60 minutes for 200° C., 60 minutes for 300° C., or 10 minutes for 400° C. to carry out an imidation reaction. When the imidation reaction was completed, a surface-coated $LiCoO_2$ positive electrode active material including a coating layer containing a polyimide and magnesium ions was obtained.

TABLE 1

|  | Polyamic acid type and amount with respect to 100 parts by weight of positive electrode active material | Metal ion type and amount with respect to 100 parts by weight of positive electrode active material |
|---|---|---|
| Example 1 | PMDA/IDA, 0.5 part by weight | $Mg^{2+}$, 0.1 part by weight |
| Example 2 | PMDA/IDA, 0.5 part by weight | $Mg^{2+}$, 0.05 part by weight |
| Example 3 | PMDA/IDA, 0.5 part by weight | $Zr^{4+}$, 0.02 part by weight |
| Example 4 | PMDA/IDA, 0.5 part by weight | — |
| Comparative Example 1 | — | — |
| Comparative Example 2 | PMDA/PDA, 0.5 part by weight | — |
| Comparative Example 3 | PMDA/PDA, 0.5 part by weight | Carbon black, 1 part by weight |

EXAMPLE 2

Surface-coated $LiCoO_2$ positive electrode active material particles were produced in the same manner as in Example 1 except that 0.5 g of DMAC containing 20 wt % of magnesium nitrate hexahydrate $(Mg(NO_3)_2 6H_2O$, FW256.41, Kwang Jin Chemical; corresponding to a $Mg^{2+}$ concentration of 2 wt % in DMAC) dissolved therein was used in the process 1 to prepare a mixed solution.

EXAMPLE 3

Surface-coated $LiCoO_2$ positive electrode active material particles were produced in the same manner as in Example 1 except that 1 g of DMAC containing 20 wt % of zirconium sulfate $(Zr(SO_4)_2$; corresponding to a $Zr^{4+}$ concentration of 6.4 wt % in DMAC) dissolved therein was used in the process 1 to prepare a mixed solution.

EXAMPLE 4

Surface-coated $LiCoO_2$ positive electrode active material particles were produced in the same manner as in Example 1 except that no magnesium nitrate was used in the process 1.

COMPARATIVE EXAMPLE 1

Non-surface coated $LiCoO_2$ positive electrode active material particles were used.

COMPARATIVE EXAMPLE 2

Surface-coated $LiCoO_2$ positive electrode active material particles were produced in the same manner as in Example 1 except that a polyamic acid produced by a condensation polymerization of PMDA and p-phenyl diamine (PDA), instead of PDMA and IDA (4,4'-iminodianiline), was used and no magnesium nitrate hexahydrate was added.

COMPARATIVE EXAMPLE 3

Surface-coated $LiCoO_2$ positive electrode active material particles were produced in the same manner as in Example 1 except that a polyamic acid produced by a condensation polymerization of PMDA and p-phenyl diamine (PDA), instead of PDMA and IDA (4,4'-iminodianiline), was used and 0.2 g of carbon black was added instead of magnesium nitrate hexahydrate.

Production of Lithium Secondary Battery

Production of Positive Electrode

The surface-coated $LiCoO_2$ positive electrode active material particles produced through Example 1 were used.

The positive electrode active material particles, carbon black as a conductive material, and a polyvinylidene fluoride (PVdF) as a binder were mixed in a weight ratio of 95:3:2, and the mixture was added to N-methyl-2-pyrrolidone (NMP) as a solvent to prepare a positive electrode mixture slurry. The positive electrode mixture slurry was applied on an aluminum (Al) thin film positive electrode current collector having a thickness of about 20 µm, dried at 130° C. for two hours, and roll-pressed to produce a positive electrode.

Production of Negative Electrode

Lithium metal foil was used as a negative electrode.

Preparation of Electrolyte Solution $LiPF_6$ was added to a non-aqueous electrolytic solvent prepared by mixing, as the electrolyte, ethylene carbonate (EC) and ethyl methyl carbonate (EMC) in a volume ratio of 1:2 to prepare a 1 M non-aqueous $LiPF_6$ electrolyte solution.

Production of Lithium Secondary Battery

A polymer battery was produced according to a conventional method using the positive electrode and negative electrode produced by the above-described methods and a polyethylene separator (Tonen Chemical Corporation, F2OBHE, thickness=20 µm). Subsequently, the non-aqueous electrolyte solution prepared by the above-described method was injected into the polymer battery to produce a coin-cell type lithium secondary battery.

EXPERIMENTAL EXAMPLE 1

Evaluation of Charging/Discharging Capacity and Efficiency

The lithium secondary batteries (battery capacity=4.3 mAh) of Examples 1 to 4 and Comparative Examples 1 to 3 which included positive electrode active material particles were charged at 0.5 C at 45° C. in a voltage range of 3 to 4.5 V and discharged at 1 C. As described in the following Equation 1, the C-rate is the ratio of capacity when a battery charged at 0.5 C is discharged at 2 C to capacity when the same battery is discharged at 0.1 C:

$$C-\text{rate} = \frac{\text{Capacity when discharged at 2 } C}{\text{Capacity when discharged at 0.1 } C} \quad \text{[Equation 1]}$$

TABLE 2

|  | Initial charge capacity (mAh/g) | Initial discharge capacity (mAh/g) | Initial efficiency (%) | C-rate (%) | Capacity retention rate after 49th discharging (%) |
|---|---|---|---|---|---|
| Example 1 | 198 | 195 | 98.5 | 98.5 | 97 |
| Example 2 | 198 | 195 | 98.5 | 98.6 | 97.1 |
| Example 3 | 199 | 195.5 | 98.2 | 98.4 | 97 |
| Example 4 | 198 | 195.3 | 98.6 | 98.2 | 97 |
| Comparative Example 1 | 200 | 196 | 98.0 | 96 | 90 |
| Comparative Example 2 | 198 | 195 | 98.5 | 97 | 95 |
| Comparative Example 3 | 199 | 195 | 98.2 | 97.5 | 95.5 |

As shown in Table 2, compared to the lithium secondary batteries of Comparative Examples 1 to 3, the lithium secondary batteries of Examples 1 to 4 have a nearly similar initial charging and discharging capacity, a higher C-rate (by as much as 2.6 percentage points), and a higher capacity retention rate after the 49th discharging (by as much as 7.1 percentage points).

Specifically, the lithium secondary battery of Example 4, which included a conductive polyimide only, has a higher C-rate (by 1.2 percentage points) and a higher capacity retention rate (by 2.0 percentage points) compared to the lithium secondary battery of Comparative Example 2, which included a non-conductive polyimide only.

The lithium secondary battery of Example 4, which included a conductive polyimide only, has a higher initial efficiency (by 0.4 percentage points), a higher C-rate (by 0.7 percentage points), and a higher capacity retention rate (by 1.6 percentage points) compared to the lithium secondary battery of Comparative Example 3, which included carbon black added to impart conductivity to a non-conductive polyimide.

In other words, the lithium secondary battery of Example 4, which included a conductive polyimide, may exhibit a higher lithium ion mobility, a higher electron mobility, and more uniform conductivity compared to the lithium secondary battery of Comparative Example 3, which included other substance(s) added to impart conductivity to a polyimide.

That is, the result of using a conductive polyimide is superior to the result of adding a conductive material to impart conductivity to a non-conductive polyimide in terms of initial efficiency, C-rate, and capacity retention rate.

In addition, in the lithium secondary batteries of Examples 1 to 3 which, unlike the lithium secondary battery of Example 4, included additional metal ions, the metal ions and the lithium ions in the secondary batteries were captured in the conductive polyimide; therefore, the lithium secondary batteries of Examples 1 to 3 exhibit higher lithium ion mobility and higher electron mobility and thus exhibit a superior C-rate and a higher capacity retention rate in comparison to the lithium secondary battery of Example 4.

While the present invention has been described in detail with reference to certain preferred embodiments thereof, it is to be understood that the present invention is not limited to the disclosed embodiments, but, on the contrary, covers various modifications and improvements made by those skilled in the art within the spirit and scope of the present invention as defined by the appended claims.

The invention claimed is:

1. Surface-coated positive electrode active material particles comprising:
positive electrode active material particles; and
a coating layer applied on a surface of the positive electrode active material particles,
wherein the coating layer includes a polyimide comprising one or more structures selected from the group consisting of pyrrole, aniline, and carbazole, and
wherein the coating layer has a thickness of 1 to 200 nm.

2. The surface-coated positive electrode active material particles according to claim 1, wherein the coating layer includes metal ions.

3. The surface-coated positive electrode active material particles according to claim 1, wherein the polyimide included in the coating layer includes aniline.

4. The surface-coated positive electrode active material particles according to claim 2, wherein the polyimide and the metal ions included in the coating layer are in a state in which the metal ions are captured by unshared electrons present in a nitrogen atom of aniline in the polyimide.

5. The surface-coated positive electrode active material particles according to claim 4, wherein the unshared electrons present in a nitrogen atom of aniline have been generated as NH dissociates to release the H as $H^+$.

6. The surface-coated positive electrode active material particles according to claim 1, wherein the polyimide is represented by Chemical Formula 4 and has been produced by a condensation polymerization of pyromellitic dianhydride (PMDA) and 4,4'-iminodianiline (IDA).

[Chemical Formula 4]

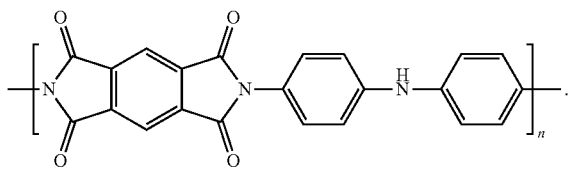

7. The surface-coated positive electrode active material particles according to claim 2, wherein the metal ions are ions of one or more metals selected from the group consisting of magnesium, aluminum, zirconium, and lithium.

8. The surface-coated positive electrode active material particles according to claim 2, wherein the metal ions are included in an amount of 3 parts by weight or less with respect to 100 parts by weight of the polyimide.

9. The surface-coated positive electrode active material particles according to claim 1, wherein the polyimide is included in an amount of 0.05 part by weight to 5 parts by weight with respect to 100 parts by weight of the positive electrode active material particles.

10. The surface-coated positive electrode active material particles according to claim 1, wherein the positive electrode active material particles comprise one or more selected from the group consisting of oxides represented by Chemical Formulas 1 to 3, and $V_2O_5$, TiS, and MoS:

 <Chemical Formula 1>

($-0.5 \leq x \leq 0.6$, $0 \leq a, b, c \leq 1$, and $x+a+b+c=1$);

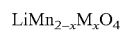 <Chemical Formula 2>

(M is one or more elements selected from the group consisting of Ni, Co, Fe, P, S, Zr, Ti, and Al, and $0 \leq x \leq 2$);

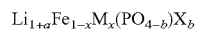 <Chemical Formula 3>

(M is one or more elements selected from the group consisting of Al, Mg, Ni, Co, Mn, Ti, Ga, Cu, V, Nb, Zr, Ce, In, Zn, and Y, X is one or more elements selected from the group consisting of F, S, and N, and $-0.5 \leq a \leq +0.5$, $0 \leq x \leq 0.5$, and $0 \leq b \leq 0.1$).

11. A method of producing surface-coated positive electrode active material particles of claim 1, the method comprising:

preparing a mixed solution by mixing a polyamic acid including one or more structures selected from the group consisting of pyrrole, aniline, and carbazole with an organic solvent (process 1);

dispersing positive electrode active material particles in the mixed solution to form a coating layer including the polyamic acid on a surface of the positive electrode active material particles (process 2); and carrying out an imidation of the positive electrode active material particles including the coating layer applied thereon (process 3).

12. The method according to claim 11, which forms a coating layer including a polyamic acid and additional metal ions through the process 2 by mixing the polyamic acid and the additional metal ions with the organic solvent during the process 1.

13. The method according to claim 12, wherein the metal ions have been generated from a metal ion precursor, wherein the metal ion precursor is one or more selected from the group consisting of an inorganic acid salt, an organic acid salt, and a metal complex of the metal ions.

14. The method according to claim 13, wherein the inorganic acid salt of the metal ions is one selected from the group consisting of magnesium nitrate, zirconium sulfate, and a mixture thereof.

15. The method according to claim 11, wherein the polyamic acid is produced by reacting a same equivalent amount of an aromatic anhydride and a diamine.

16. The method according to claim 15, wherein at least one of the aromatic anhydride and the diamine include one or more structures selected from the group consisting of pyrrole, aniline, and carbazole.

17. The method according to claim 15, wherein the diamine is 4,4'-iminodianiline.

18. The method according to claim 11, wherein the polyamic acid is used in an amount of 0.1 part by weight to 1 part by weight with respect to 100 parts by weight of the organic solvent.

19. A secondary battery comprising:
a positive electrode including a positive electrode mixture including the surface-coated positive electrode active material particles according to claim 1 applied thereon;
a negative electrode; and
a separator interposed between the positive electrode and the negative electrode.

* * * * *